(12) United States Patent
Uribe et al.

(10) Patent No.: US 7,589,047 B1
(45) Date of Patent: Sep. 15, 2009

(54) COMPOSITE MATERIALS AND METHOD OF MAKING

(75) Inventors: Francisco A. Uribe, Los Alamos, NM (US); Mahlon S. Wilson, Los Alamos, NM (US); Fernando H. Garzon, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 390 days.

(21) Appl. No.: 11/449,407

(22) Filed: Jun. 8, 2006

(51) Int. Cl.
*B01J 23/56* (2006.01)
(52) U.S. Cl. .................................................. 502/332
(58) Field of Classification Search ................. 427/97.9, 427/99.5, 304
See application file for complete search history.

(56) References Cited

U.S. PATENT DOCUMENTS

| | | | |
|---|---|---|---|
| 3,032,436 A * | 5/1962 | Gostin et al. ................. 427/304 |
| 3,892,592 A | 7/1975 | Fukuda et al. | |
| 4,171,393 A * | 10/1979 | Donley et al. ................. 427/354 |
| 4,521,800 A * | 6/1985 | Howe .......................... 257/755 |
| 5,601,652 A * | 2/1997 | Mullin et al. .......... 118/723 EB |
| 5,879,828 A | 3/1999 | Debe et al. ..................... 429/41 |
| 6,203,936 B1* | 3/2001 | Cisar et al. ..................... 429/44 |
| 6,761,755 B2* | 7/2004 | Jantsch et al. ................... 96/11 |
| 2005/0238906 A1* | 10/2005 | Cooper et al. ................ 428/646 |

OTHER PUBLICATIONS

Bunshah, R.F. (1994). Handbook of Deposition Technologies for Films and Coatings—Science, Technology and Applications (2nd Edition). (pp. 600). William Andrew Publishing/Noyes. Online version available at: http://knovel.com/web/portal/browse/display?_EXT_KNOVEL_DISPLAY_bookid=57&VerticalID=0.*
Gad-el-Hak. (2002). The MEMS Handbook, CRC Press LLC, (Ch 36, pp. 4).*
Dodd et al(Dictionary of Ceramics (3rd Edition) Manley Publishing, 1994, pp. 35, 56, 106, 181).*
Dodd et al(Dictionary of Ceramics (3rd Edition) Manley Publishing, 1994, pp. 35, 56, 106, 181.*

\* cited by examiner

*Primary Examiner*—Melvin C Mayes
*Assistant Examiner*—Michael Forrest
(74) *Attorney, Agent, or Firm*—Robert P. Santandrea; Juliet A. Jones

(57) ABSTRACT

A method of depositing noble metals on a metal hexaboride support. The hexaboride support is sufficiently electropositive to allow noble metals to deposit spontaneously from solutions containing ionic species of such metals onto the support. The method permits the deposition of metallic films of controlled thickness and particle size at room temperature without using separate reducing agents. Composite materials comprising noble metal films deposited on such metal hexaborides are also described. Such composite materials may be used as catalysts, thermionic emitters, electrical contacts, electrodes, adhesion layers, and optical coatings.

8 Claims, 8 Drawing Sheets

500

COMPOSITE MATERIALS AND METHOD OF MAKING

STATEMENT REGARDING FEDERAL RIGHTS

This invention was made with government support under Contract No. W-7405-ENG-36, awarded by the U.S. Department of Energy. The government has certain rights in the invention.

BACKGROUND OF INVENTION

The invention relates to composite materials. More particularly, the invention relates to composite materials comprising a noble metal film deposited on a low work function support. Even more particularly, the invention relates to composite materials comprising a noble metal film deposited on a metal hexaboride support.

Noble metals, such as gold, platinum, and the like, have high electrical conductivity, chemical stability, and superior catalytic properties. Due to these properties, they are used in a variety of applications, including electrical contacts, chemical catalysts, and fuel cell electrodes.

The cost of such noble metals, however, is considered to be prohibitive, and considerable effort has been made to minimize the amount of such metals used in different applications while maximizing their beneficial effects. To this end, thin films of noble metals are frequently deposited on a relatively inert support, such as, for example, a ceramic or carbon. Even here, the effectiveness of the noble metals is limited by their tendency to ball up rather than wet the surface of the support. Moreover, thin films of such noble metals are usually deposited by physical vapor deposition methods, which in themselves add multiple levels of complexity.

Presently, there are no methods for depositing noble metals on support materials that have low work functions at room temperature or in open air. Therefore, what is needed is a low temperature method of depositing thin films of noble metals on a support having a low work function. What is also needed is a composite material comprising a thin film of such noble metals.

SUMMARY OF INVENTION

The present invention meets these and other needs by providing a method of depositing noble metals on a metal hexaboride support. The hexaboride support is sufficiently electropositive to allow noble metals to spontaneously deposit from solutions containing ionic species of such metals onto the support. The method permits the deposition of metallic films of controlled thickness and particle size at room temperature and in open air (i.e., ambient conditions) without using separate reducing agents. Composite materials comprising noble metal films deposited on such low work function metal hexaborides are also described. These composite materials may be used as catalysts, thermionic emitters, electrical contacts, electrodes, adhesion layers, and optical coatings.

Accordingly, one aspect of the invention is to provide a composite material. The composite material comprises: a support comprising at least one metal hexaboride; and a film disposed on the support, wherein the film comprises at least one noble metal and has a thickness of up to about 1000 nm.

A second aspect of the invention is to provide a method of making a composite material. The composite material comprises a support comprising at least one metal hexaboride and a film disposed on the support, wherein the film comprises at least one noble metal. The method comprises the steps of: providing the support; providing a solution having a predetermined concentration of at least one noble metal compound; and contacting the solution with the support, wherein the at least one noble metal deposits on the support to form the composite material.

A third aspect of the invention is to provide a composite material. The composite material comprises: a support comprising at least one metal hexaboride; and a film disposed on the support, wherein the film comprises at least one noble metal and has a thickness of up to about 1000 nm. The composite material is formed by: providing the support; providing a solution having a predetermined concentration of at least one noble metal compound; and contacting the solution with the support, wherein the at least one noble metal deposits on the support to form the composite material.

A fourth aspect of the invention is to provide a membrane electrode assembly for a fuel cell. The membrane electrode assembly comprises: an ionomeric membrane; an anode disposed on a first surface of the ionomeric membrane; and a cathode catalyst disposed on a second surface of the ionomeric membrane. The cathode catalyst comprises a composite material. The composite material comprises: a support comprising at least one metal hexaboride; and a film disposed on the support. The film comprises at least one noble metal and has a thickness of up to about 1000 nm.

These and other aspects, advantages, and salient features of the present invention will become apparent from the following detailed description, the accompanying drawings, and the appended claims.

DETAILED DESCRIPTION

Figure 1:
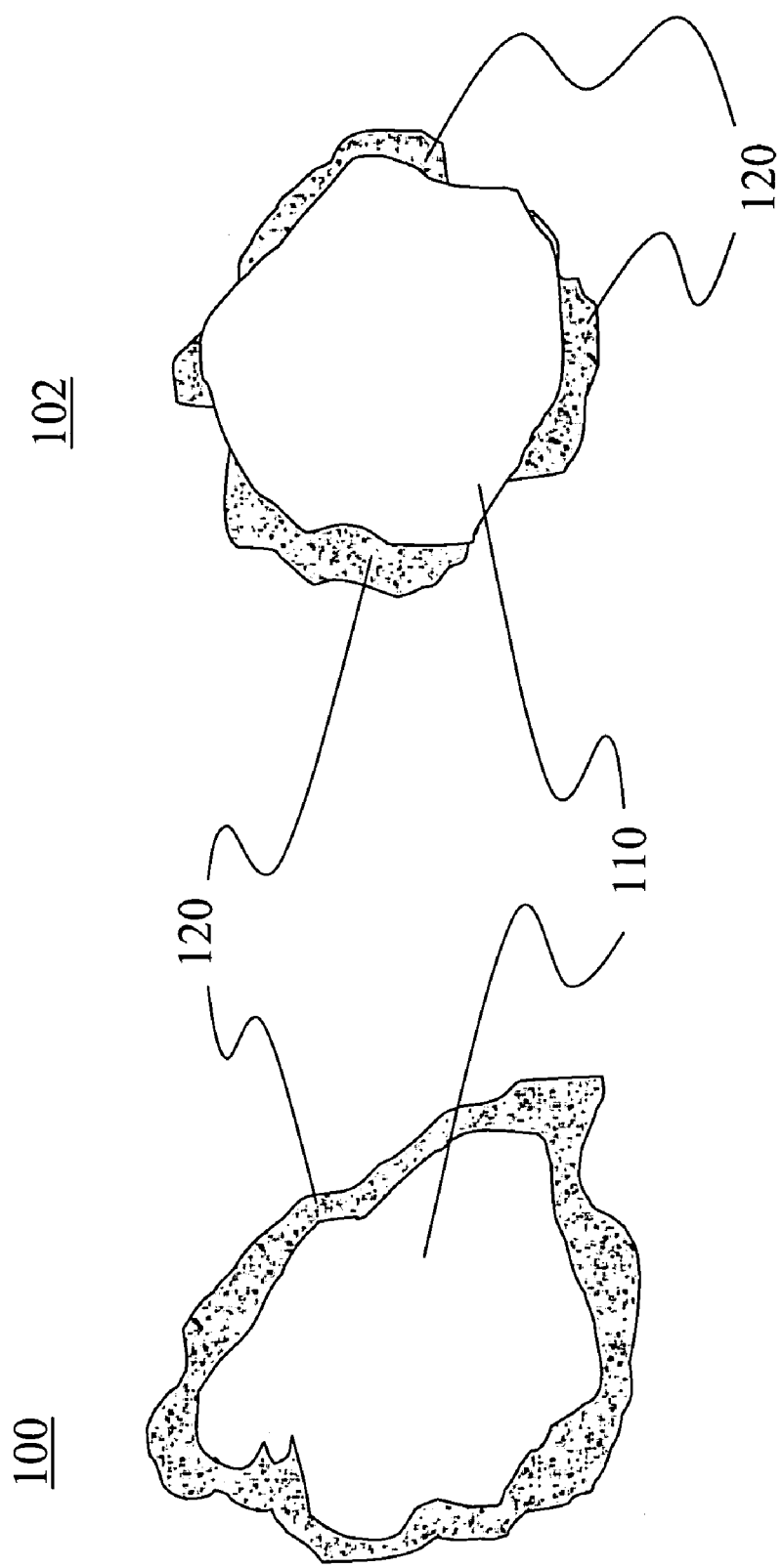
FIG. 1 is are schematic cross-sectional views of a composite material.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general and to FIG. 1 in particular, it will be understood that the illustrations are for the purpose of describing a particular embodiment of the invention and are not intended to limit the invention thereto. Turning to FIG. 1, two schematic cross-sectional views of a composite material 100, 102 of the present invention are shown. Composite material 100, 102 comprises a support 110 that includes at least one metal hexaboride. A film 120 comprising at least one noble metal is disposed on the at least one metal hexaboride. Film 120 has a thickness of up to about 1000 nm.

In one embodiment, support 110 is powder comprising the at least one metal hexaboride. Individual particles that make up the powder are schematically shown in FIG. 1. Film 120 is disposed on the outer surface of the powder, covering at least a portion of support 110. Film 120 may completely coat (100 in FIG. 1) support 110, or cover only a portion (102 in FIG. 1) of support 110. The powder comprising support 110 may have a high surface area. Support 110, in one embodiment, has a surface area of at least 1 $m^2/g$. In one embodiment, the at least one metal hexaboride is a hexaboride selected from the group consisting of lanthanide hexaborides, alkaline earth hexaborides, and combinations thereof. Lanthanide hexaborides that may be used to form support 110 include, but are not limited to, yttrium hexaboride, cerium hexaboride, gadolinium hexaboride, europium hexaboride, and combinations thereof. Rare earth hexaborides may include calcium hexaboride, strontium hexaboride, barium hexaboride, and combinations thereof.

Support 110 also has a low work function. In one embodiment, support 110 has a work function of up to about 3 eV in vacuum. In another embodiment, support 110 has a work function in a range from about 1 eV to about 3 eV in vacuum.

Figure 2:
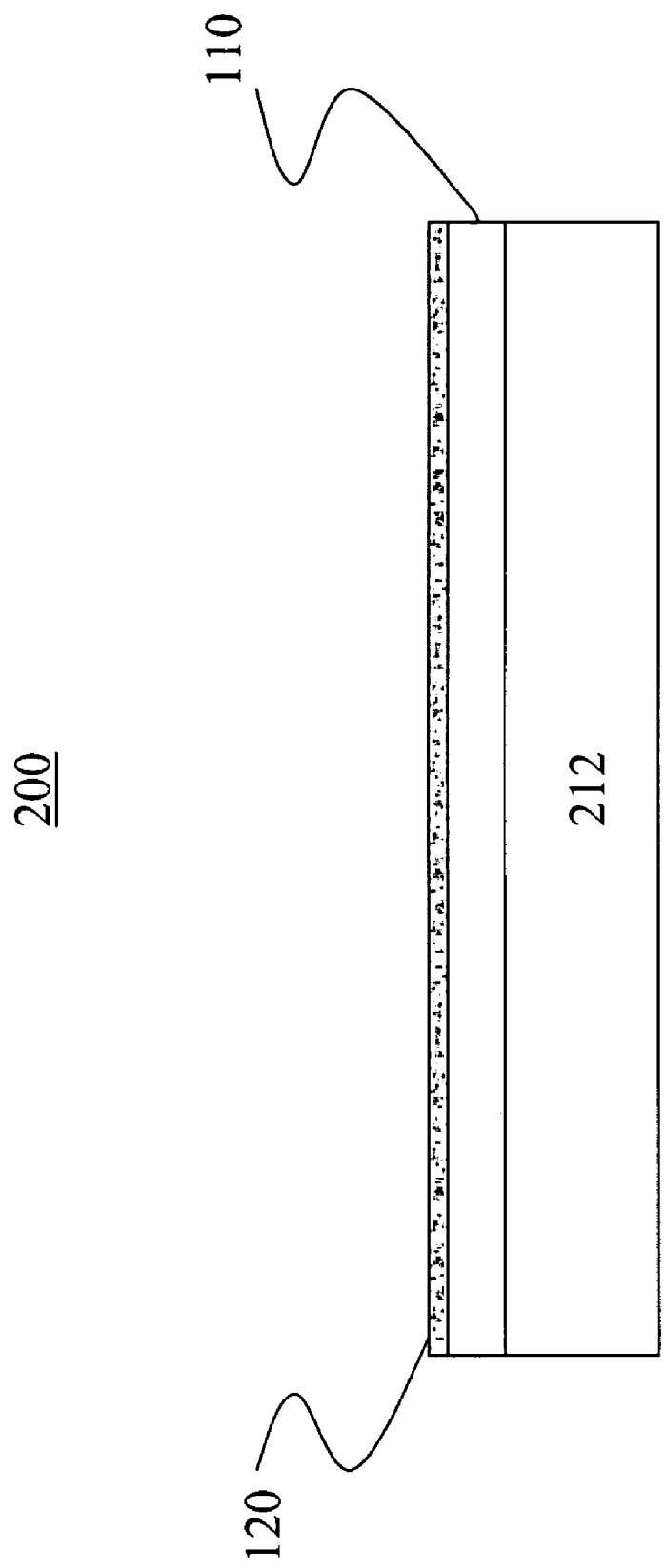
FIG. 2 a schematic cross-sectional view of a second embodiment of a composite material.

In another embodiment, shown in FIG. 2, support 110 may be optionally deposited as a layer on a substrate 212, which provides mechanical support for the layer of at least one hexaboride and may comprise, for example, alumina, quartz, silicon, carbon, yttria stabilized zirconia, silicon glass, or the like.

Film 120 comprises at least one noble metal selected from the group consisting of platinum, rhodium, iridium, gold, silver, palladium, and combinations thereof. Film 120 has a thickness of up to about 1000 nm. In one embodiment, film 120 consists essentially of the at least one noble metal. Residues or inclusions from the deposition, however, may also be present in film 120. In some instances, these residues or inclusions may also have a beneficial effect on the performance and properties of composite material 100, 102.

Composite material 100, 102, 200 may be used as a thin film composite for electronic circuits, a catalyst support for fuel cells, a catalyst composite having new or specifically tailored properties, a thermionic emitter, an electrical contact, an adhesion layer, or an optical coating.

Figure 3:
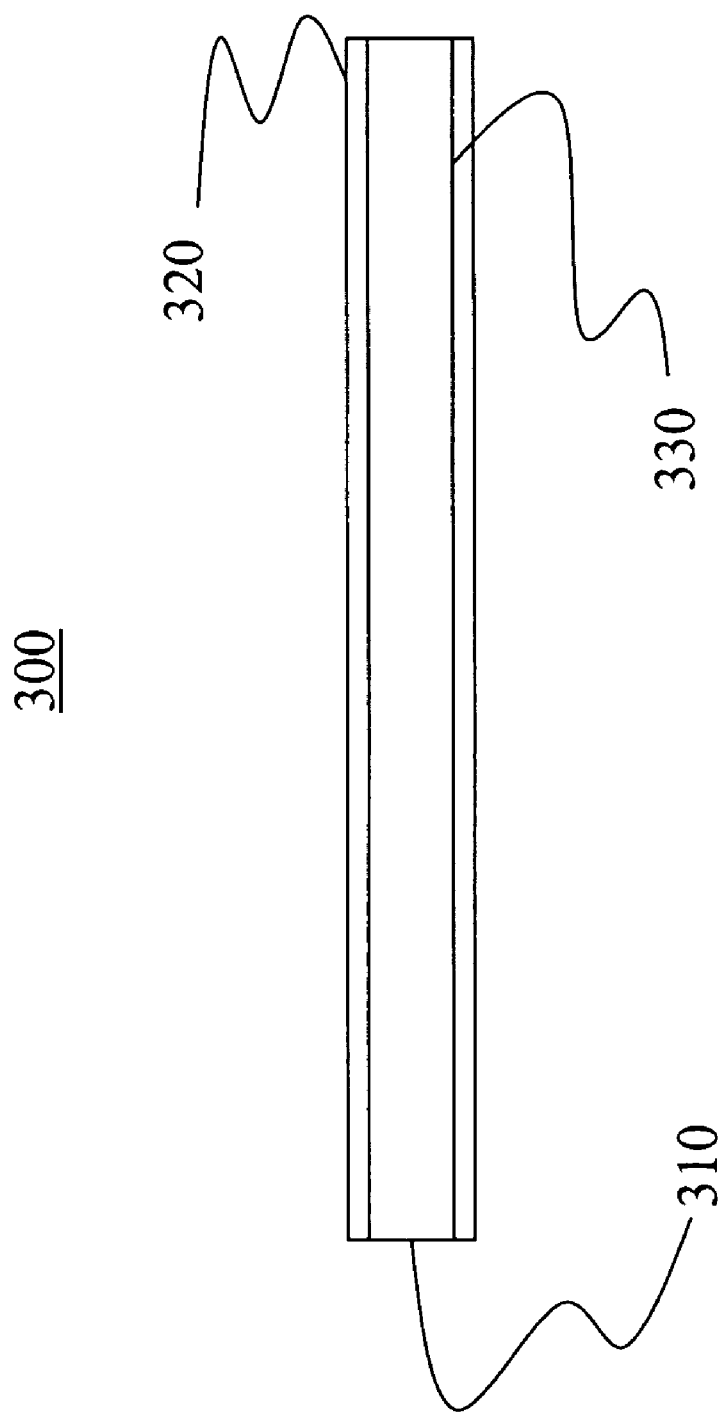
FIG. 3 is a schematic cross section of a membrane electrode assembly.

In one embodiment, the low function work material forms a portion of a fuel cell membrane electrode assembly (also referred to herein as "MEA"), where the composite material 100, 102, 200 serves as a cathode catalyst and/or an anode electrocatalyst. The MEA is particularly useful in polymer electrolyte fuel cells (also referred to herein as "PEFCs"). A schematic cross section of a membrane electrode assembly of the present invention is shown in FIG. 3. MEA 300 comprises an ionomeric membrane 310, a cathode catalyst 320 disposed on a first surface of ionomeric membrane 310, and an anode catalyst 330 disposed on a second surface of ionomeric membrane 310.

Cathode catalyst 320 comprises composite material 100, 102, 200 described herein. Anode catalyst 330 comprises at least one metal selected from those metals, such as, but not limited to, platinum, ruthenium, palladium, and combinations thereof that are known and used in the art as fuel cell anode materials. Cathode catalyst 320 and Anode catalyst 330 are typically deposited on ionomeric membrane 310 by preparing an ink containing the at least one metal and applying the ink to first surface and second surfaces, respectively, of ionomeric membrane 310.

In one embodiment, ionomeric membrane 310 is a poly (perfluorosulphonic acid) membrane which is commercially available as Nafion® 117, Aciplex®, or Flemion®. Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ketone) and poly(arylene ether sulfone); polybenzimidazole; polyphosphazene, such as poly [(3-methylphenooxy) (phenoxy) phosphazene] and poly [bis(3-methylphenoxy) phosphazene]; derivatives thereof; and combinations thereof may also be used.

Figure 4:
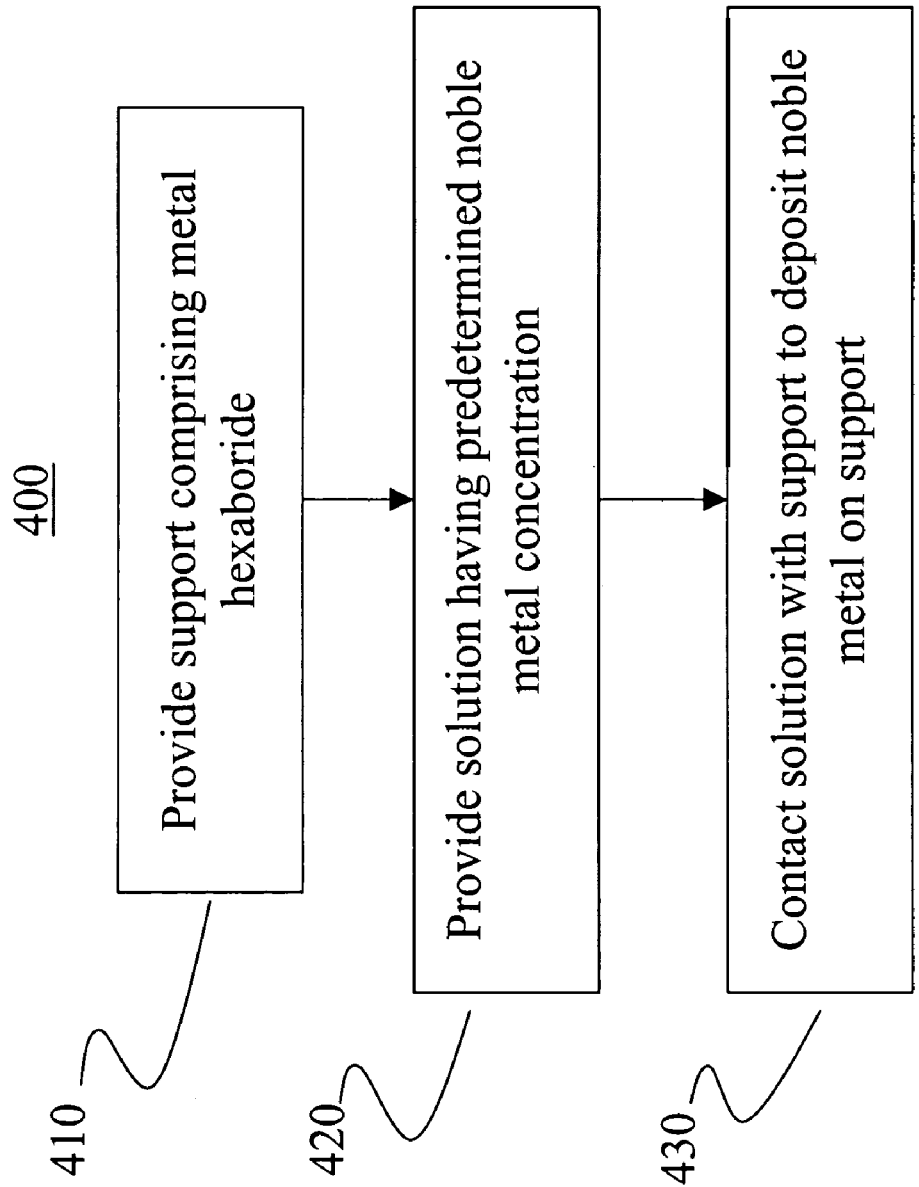
FIG. 4 is a flow chart outlining a method of making a composite material.

The invention also includes a method of making the composite material 100, 102, 200 described hereinabove. A flow chart outlining method 400 is shown in FIG. 4. In Step 410, support 110 comprising at least one metal hexaboride, as previously described herein, is provided. As previously mentioned, support 110 may be provided in powder form, or as a film deposited on substrate 212.

A solution containing a predetermined concentration of at least one noble metal compound is provided in Step 420. The predetermined concentration is a concentration at which the solution has a redox potential that is positive with respect to the redox potential of support 110. In one embodiment, the predetermined concentration of the at least one noble metal compound is in a range from about 0.1 mM to about 100 mM.

The noble metal is selected from the group consisting of platinum, rhodium, iridium, gold, silver, and palladium. The noble metal compounds that may be used in method 400 include, but are not limited to, noble metal salts, such as chlorides (e.g., $AuCl_3$, $PtCl_4$, and $RhCl_3$), cyanides (e.g., $Au(CN)_3$), and nitrates (e.g., $Pd(NO_3)_2$, $AgNO_3$), and the like. Alternatively, the noble metal compounds may include complexes such as, but not limited to, $HAuCl_4$ and $H_2PtCl_6$.

In one embodiment, the solution containing the at least one noble metal compound is an aqueous solution. In another embodiment, the solution is an organic solution comprising at least one of propylene carbonate, acetonitrile, dimethylsulfoxide (DMSO), and the like. Alternatively, the solution is a molten salt such as, but not limited to, an alkali metal salt (e.g., NaCl—KCl) melt, a sodium hydroxide-cryolite melt, an imidazolium melt, and the like.

In Step 430, the solution is brought into contact with support 110, causing the noble metal to precipitate or deposit on support 110 to form the composite material 100, 102, 200.

Composite material 100, 102, 200 may typically be prepared in bulk by weighing an amount of support 110 into a vial and adding a small amount of water to the vial. Under constant stirring, a given volume of the solution containing the at least one noble metal compound is then added to the vial, and the spontaneous reaction is allowed to proceed for a predetermined period of time (usually about two hours). The solid composite material is then separated from the solution by centrifugation and removing the solution. Alternatively, the solid material may be removed by filtration or the like.

The spontaneous deposition of noble metals by method 400 is extremely simple, and does not require electrochemical deposition or the use of strong reducing agents such as hydrides. The thickness of the deposits can be controlled by the concentration of the noble metal ion in solution and by the time of immersion of the composite material in the solution.

The following examples illustrate the advantages and features of the invention and are in no way intended to limit the invention thereto.

Example 1

Deposition of Platinum and Gold from Aqueous Solutions onto a $LaB_6$ Thin Film Thin film samples of lanthanum hexaboride ($LaB_6$) were prepared on glass, sapphire, and aluminum oxide substrates via RF magnetron sputtering. A stoichiometric $LaB_6$ target having a 6 inch (approximately 15 cm) diameter was used as the source material, and an Argon plasma, generated at 5 millitorr pressure and 120 W of power, was used to deposit the $LaB_6$ thin films. The stoichiometry of each of the films was verified using energy dispersive x-ray analysis.

An aqueous solution containing 5 mM of $HAuCl_4$ was prepared. Similarly, an aqueous solution containing 20 mM of $H_2PtCl_6$ solution was prepared. At least one drop of each solution was deposited on the $LaB_6$ film. After one minute, the specimen was rinsed with de-ionized water to remove excess solution.

Figure 5:
FIG. 5 is a photograph showing gold and platinum films that were spontaneously deposited on $LaB_6$.

FIG. 5 shows a gold film 522 and a platinum film 524 that were spontaneously deposited on a $LaB_6$ film 510 that had been previously sputtered onto a glass slide. Metal deposition can be easily observed soon after the acid solutions come into contact with the hexaboride. As seen in FIG. 5, "mirror like" deposits of noble metals can be easily achieved. Using a profilimeter, the thickness of platinum film 524 was estimated to be 30 nm. The thicknesses of the metal deposits can be controlled by the acid solution concentration and the reaction time.

Example 2

Platinum Deposition on a Hexaboride Powder Film

Figure 6:
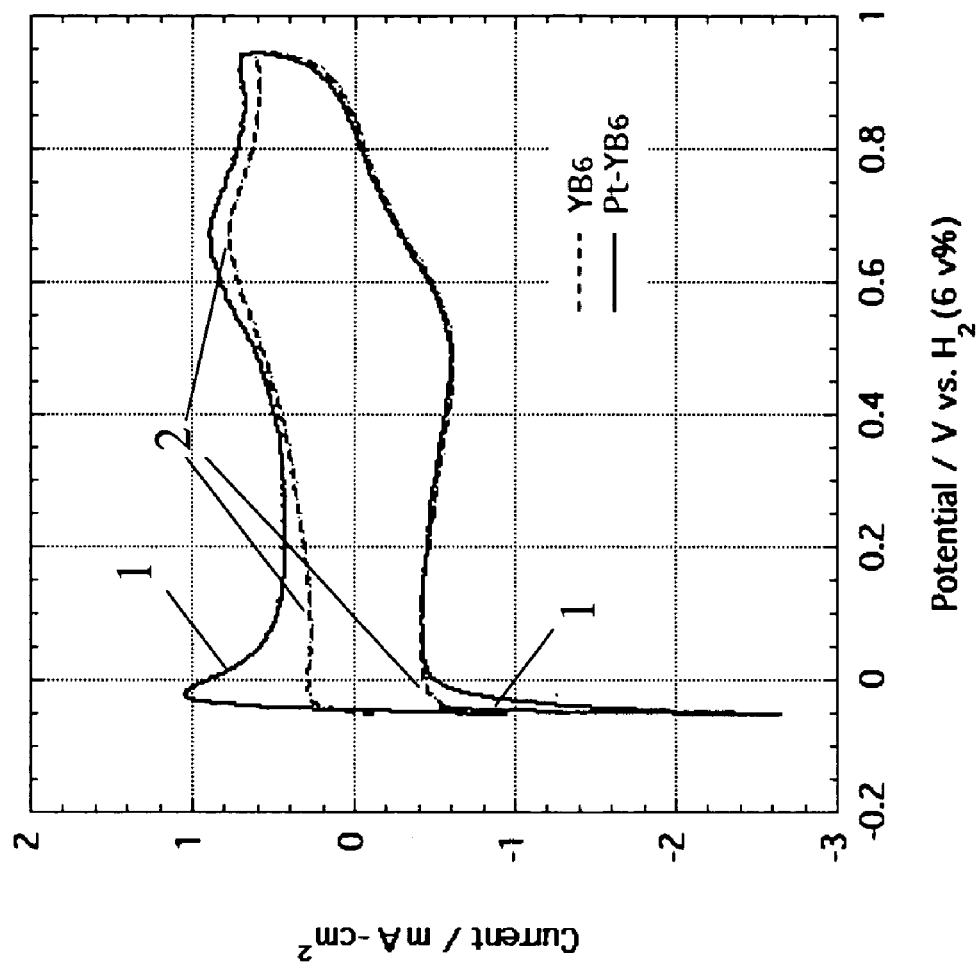
FIG. 6 is a cyclic voltametry (CV) plot obtained for $YB_6$ and Pt—$YB_6$ electrodes in a 0.5 M $H_2SO_4$ solution purged with argon.

Electrodes were prepared by depositing 10 μL of an aqueous yttrium hexaboride ($YB_6$) suspension onto commercially available glassy carbon disk electrodes. After drying in air for at least 3 hours, a $YB_6$ thin film was formed on the glassy carbon substrate. The electrode was electrochemically tested in a 0.5 M $H_2SO_4$ solution purged with argon, and the results are shown in FIG. 6 (curve 2). The electrode was then removed from the cell, rinsed with water, and dried for 15 minutes. 10 μL of 0.2 mM $H_2PtCl_6$ solution was then placed on the dried $YB_6$ film. After the water evaporated (about 2 hours), the electrode was rinsed in water and then electrochemically tested again in the 0.5 M $H_2SO_4$ solution. Cyclic voltametry (CV) results obtained for the Pt—$YB_6$ material are shown in FIG. 6. Curve 1, obtained for Pt—$YB_6$, shows high currents in the domain from −0.05 to 0.3 V, which correspond to the reversible reactions for underpotential deposition of hydrogen:

$$H^+ + e^- + Pt \rightarrow Pt-H \qquad [1];$$

and hydrogen evolution:

$$2H^+ + 2e^- \rightarrow H_2 \qquad [2].$$

The high activities observed for these reactions reveal the presence of Pt on the $YB_6$ surface.

The results shown in FIG. 6 demonstrate that $LaB_6$ powder can be used as a support for highly dispersed platinum catalyst for fuel cell electrodes. Ceramic lanthanide hexaborides such as $LaB_6$, $YB_6$ and $CeB_6$ are chemically stable, insoluble in sulfuric acid, and have good electronic conductivity, which are properties required in catalyst supports for these kinds of fuel cells. In addition, these supports may contribute to enhanced Pt-kinetic activity for the electrochemical reduction of oxygen:

$$O_2 + 4H^+ + 4e^- \rightarrow 2H_2O \qquad [3].$$

Figure 7:
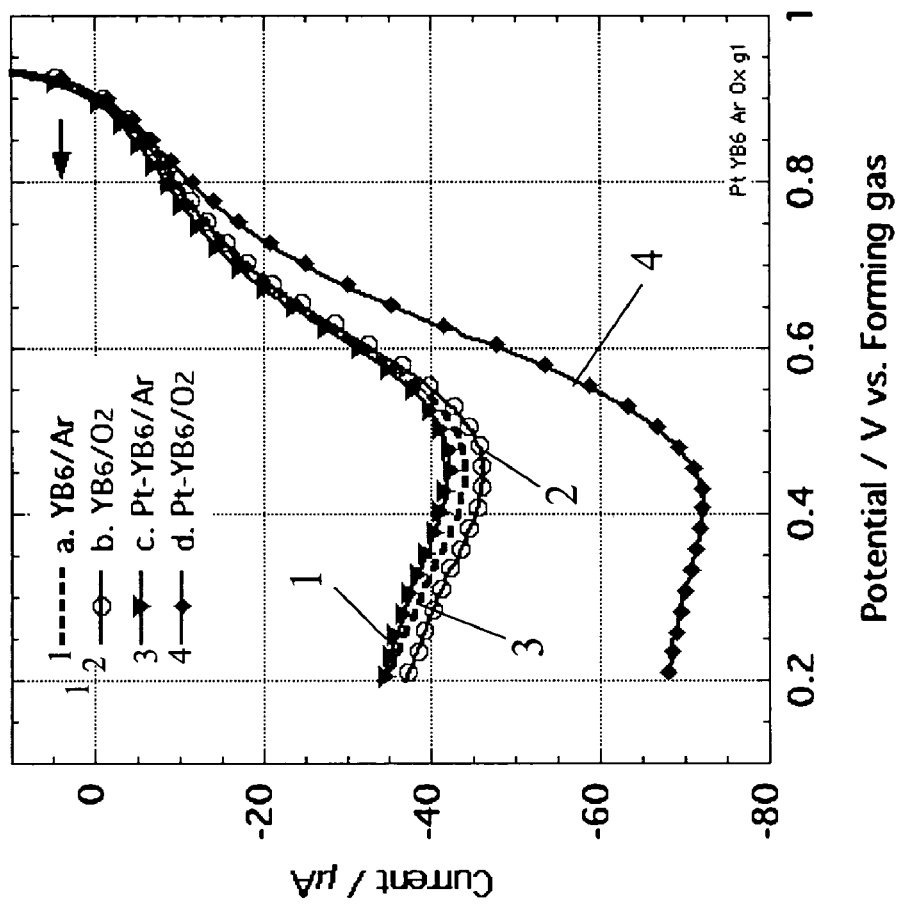
FIG. 7 is a sweep voltametry obtained for $YB_6$ and Pt—$YB_6$ powder film electrodes in 0.5 M $H_2SO_4$ purged with either oxygen or argon.

The activities of these catalysts for the oxygen reduction reaction (ORR) are shown in FIG. 7. The electrode was prepared as described above. Only curve 4, obtained for Pt—$YB_6$ in the presence of oxygen, displays significant currents for the oxygen reduction reaction (ORR).

Example 3

Platinum Deposition on $CeB_6$/Carbon Composite

A cerium hexaboride ($CeB_6$)-carbon composite was prepared and tested for its electrocatalytic activities. The results obtained are plotted in FIG. 8 (curve 1). Platinum was then deposited on $CeB_6$ using the method described in Example 2.

Platinum film deposition was verified using energy dispersive X-ray analysis. The composition of the surface of the $CeB_6$ films changed after the metal deposition process. The increase in the oxygen Kα fluorescent peak indicated that oxidation of the lanthanide hexaboride films was occurring.

X-ray diffraction data indicated that, even though both SEM/EDS and X-ray fluorescence spectroscopy showed that Pt was present, no crystalline Pt diffraction was observed at low concentration loadings. This result suggests that the low concentration deposition films are too thin to produce bulk diffraction.

Figure 8:
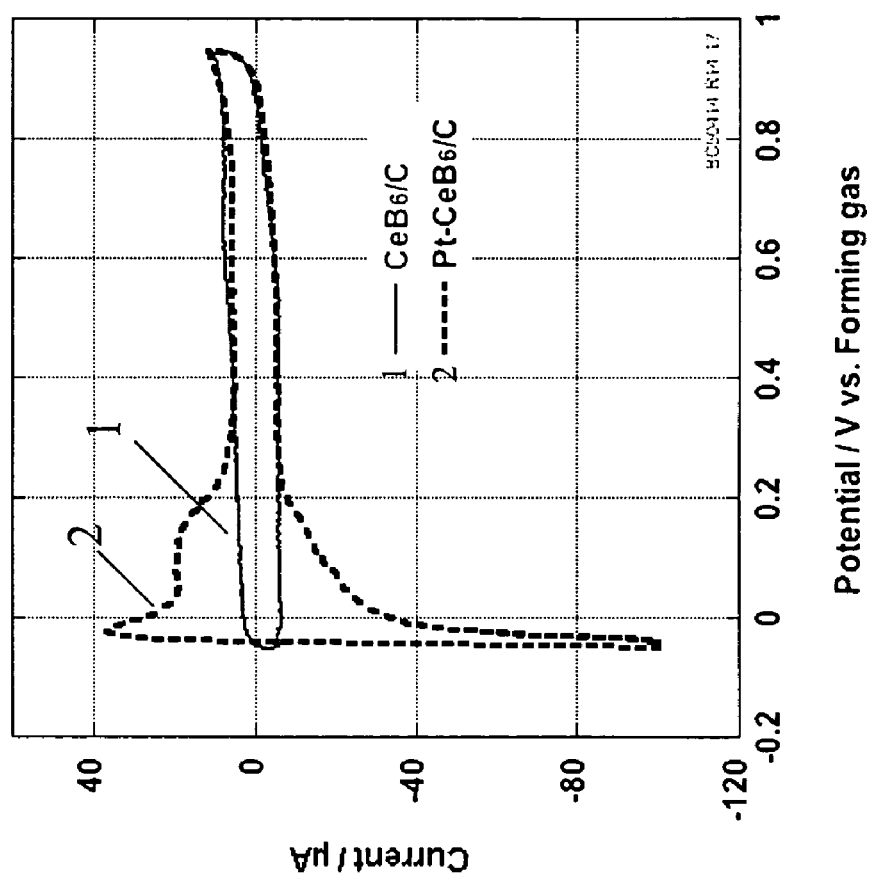
FIG. 8 is a CV plot obtained for $CeB_6/C$ and Pt—$CeB_6/C$ electrodes in a 0.5 M $H_2SO_4$ solution purged with argon.

Cyclic voltametry (CV) data obtained for the Pt—$CeB_6$/carbon electrode in a $0.5H_2SO_4$ solution is shown in FIG. 8. In addition to the activities for reactions [1] and [2], is clearly indicated by the cathodic currents between −0.05 and 0.3 V (curve 2 in FIG. 8). These reactions are reversible, as indicated by the corresponding anodic currents in the same potential range. The catalyst was also tested for ORR and exhibited considerable activity for this reaction.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of making a composite material, wherein the composite material comprises a support and a film disposed on the support, the film comprising at least one noble metal, the method comprising the steps of:
   a. providing the support;
   b. providing a solution having a predetermined concentration of at least one noble metal compound; and
   c. contacting the solution with the support, wherein the support comprises at least one ceramic metal hexaboride, wherein the at least one noble metal spontaneously deposits on the support to form the composite material.

2. The method according to claim 1, wherein the predetermined concentration is a concentration at which the solution has a first redox potential and the support has a second redox potential, wherein the first redox potential is positive with respect to the second redox potential.

3. The method according to claim 1, wherein the predetermined concentration of the at least one noble metal compound is in a range from about 0.1 mM to about 100 mM.

4. The method according to claim 1, wherein the at least one noble metal compound is a noble metal salt.

5. The method according to claim 1, wherein the at least one noble metal compound is one of a noble metal chloride, a noble metal cyanide, and a noble metal nitrate.

6. The method according to claim 1, wherein the solution is an aqueous solution.

7. The method according to claim 1, wherein the solution is an organic solution comprising at least one of propylene carbonate, acetonitrile, and dimethylsulfoxide.

8. The method according to claim 1, wherein the solution is a molten salt, the molten salt comprising at least one of a NaCl—KCl melt an NaOH cryolite melt, and an imadozlium melt.

* * * * *